(12) United States Patent
Solomon et al.

(10) Patent No.: US 7,720,030 B2
(45) Date of Patent: May 18, 2010

(54) TECHNIQUES FOR EXPLICIT FEEDBACK DELAY MEASUREMENT

(75) Inventors: Trainin B. Solomon, Haifa (IL); Kasher Assaf, Haifa (IL); Kaidar Oren, Binyamina (IL); Myszne Jorge, Zikhron Ya'Akov (IL); Basson Gal, Haifa (IL)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 11/364,934

(22) Filed: Feb. 28, 2006

(65) Prior Publication Data

US 2007/0201566 A1    Aug. 30, 2007

(51) Int. Cl.
*H04W 4/00*    (2009.01)
(52) U.S. Cl. .................. 370/329; 370/342; 370/400; 370/465; 455/69; 455/101; 455/557; 455/562.1; 455/575.7

(58) Field of Classification Search ............. 370/334, 370/335, 342, 400, 465; 455/25, 69, 101, 455/557, 562.1, 575.7; 375/259, 267, 299; 713/166
See application file for complete search history.

(56) References Cited

U.S. PATENT DOCUMENTS

| | | | |
|---|---|---|---|
| 7,099,698 B2 * | 8/2006 | Tarokh et al. | 455/562.1 |
| 7,376,192 B2 * | 5/2008 | Koorapaty et al. | 375/259 |
| 2004/0177270 A1 * | 9/2004 | Little et al. | 713/200 |
| 2005/0238111 A1 * | 10/2005 | Wallace et al. | 375/267 |
| 2006/0098760 A1 * | 5/2006 | Shen et al. | 375/299 |
| 2006/0120477 A1 * | 6/2006 | Shen et al. | 375/267 |
| 2007/0066238 A1 * | 3/2007 | Zhang et al. | 455/69 |
| 2008/0005219 A1 * | 1/2008 | Nabar et al. | 709/201 |

* cited by examiner

*Primary Examiner*—Dwayne Bost
*Assistant Examiner*—Inder P Mehra
(74) *Attorney, Agent, or Firm*—Kacvinsky LLC

(57) ABSTRACT

Techniques for explicit feedback delay measurement are described. An apparatus may comprise a processor to generate a steering matrix for transmit spatial processing over a channel, determine a delay time associated with explicit feedback information for the channel, and determine whether to modify the steering matrix with the explicit feedback information based on the delay time. Other embodiments are described and claimed.

16 Claims, 3 Drawing Sheets

US 7,720,030 B2

TECHNIQUES FOR EXPLICIT FEEDBACK DELAY MEASUREMENT

BACKGROUND

Modern wireless communication systems may operate according to Institute of Electrical and Electronics Engineers (IEEE) standards such as the 802.11 standards for Wireless Local Area Networks (WLANs) and the 802.16 standards for Wireless Metropolitan Area Networks (WMANs). Worldwide Interoperability for Microwave Access (WiMAX) is a wireless broadband technology based on the IEEE 802.16 standard of which IEEE 802.16-2004 and the 802.16e amendment are Physical (PHY) layer specifications. IEEE 802.16-2004 supports several multiple-antenna techniques including Alamouti Space-Time Coding (STC), Multiple-Input Multiple-Output (MIMO) antenna systems, and Adaptive Antenna Systems (AAS).

Future wireless communication systems are expected to support multiple antenna techniques such as MIMO and spatial division multiple access (SDMA) modes of transmission, which allow spatial multiplexing of data streams from one or multiple users. The performance and complexity of such systems will strictly depend on the number of antennas used. There is a need, therefore, to develop highly efficient architectures for realization of different signal processing algorithms in MIMO-OFDM systems having a large number of antenna elements.

DETAILED DESCRIPTION

The embodiments are generally directed to multiple antenna systems. Various embodiments are directed to techniques for explicit feedback delay measurement for MIMO systems. The explicit feedback delay measurement techniques may improve the performance of a MIMO system. For example, the explicit feedback delay measurement techniques may reduce or prevent unnecessary modifications to one or more steering matrices used for beamforming operations with potentially irrelevant data. In one embodiment, a MIMO system may include a wireless device having an antenna array, one or more transceivers, and a processor. The antenna array may be used to perform transmit spatial processing over a wireless communications channel. The transceiver may be arranged to receive explicit feedback information for the channel. The processor may be arranged to generate a steering matrix for performing transmit spatial processing over the channel using the antenna array. The processor may determine a delay time associated with the explicit feedback information. The processor may determine whether to modify the steering matrix with the explicit feedback information based on the delay time. In this manner, a MIMO transceiver may potentially avoid updating the steering matrix used for beamforming operations with unreliable or irrelevant data about the communications channel. Other embodiments are described and claimed.

Figure 1:
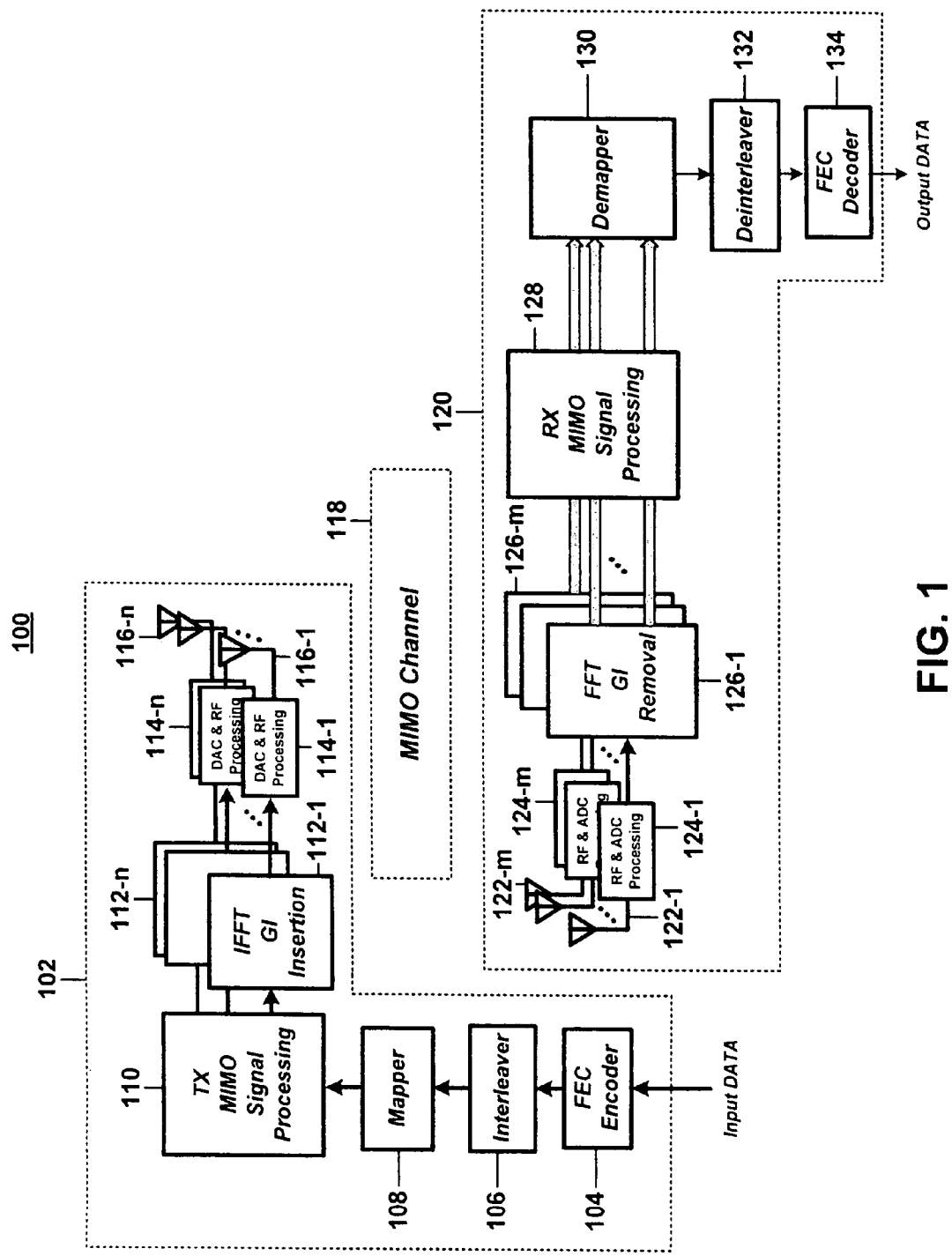
FIG. 1 illustrates one embodiment of a communications system.

FIG. 1 illustrates one embodiment of a communications system. FIG. 1 illustrates a block diagram of a communications system 100. In various embodiments, communications system 100 may comprise multiple nodes. A node generally may comprise any physical or logical entity for communicating information in communications system 100. A given node may be implemented as hardware, software, or any combination thereof, as desired for a given set of design parameters or performance constraints. Examples of nodes may include a computer, a computer system, a computer sub-system, an appliance, a workstation, a terminal, a server, a personal computer (PC), a laptop, an ultra-laptop, a handheld computer, a personal digital assistant (PDA), a set top box (STB), a telephone, a mobile telephone, a cellular telephone, a handset, a smart phone, a wireless access point, a base station (BS), a subscriber station (SS), a mobile subscriber center (MSC), a radio network controller (RNC), and so forth. Although FIG. 1 may show a limited number of nodes by way of example, it can be appreciated that more or less nodes may be employed for a given implementation. The embodiments are not limited in this context.

Communications system 100 may communicate information in accordance with one or more standards, such as standards promulgated by the IEEE, the Internet Engineering Task Force (IETF), the International Telecommunications Union (ITU), and so forth. In various embodiments, for example, communications system 100 may communicate information according to one or more IEEE 802 standards including IEEE 802.11 standards (e.g., 802.11a, b, g/h, j, n, and variants) for WLANs and/or 802.16 standards (e.g., 802.16-2004, 802.16.2-2004, 802.16e, 802.16f, and variants) for WMANs. Communications system 100 may communicate information according to one or more of the Digital Video Broadcasting Terrestrial (DVB-T) broadcasting standard and the High performance radio Local Area Network (HiperLAN) standard. The embodiments are not limited in this context.

In various embodiments, communications system 100 may employ one or more protocols such as medium access control (MAC) protocol, Physical Layer Convergence Protocol (PLCP), Simple Network Management Protocol (SNMP), Asynchronous Transfer Mode (ATM) protocol, Frame Relay protocol, Systems Network Architecture (SNA) protocol, Transport Control Protocol (TCP), Internet Protocol (IP), TCP/IP, X.25, Hypertext Transfer Protocol (HTTP), User Datagram Protocol (UDP), and so forth.

In various embodiments, communications system 100 may comprise or form part of a network, such as a WiMAX network, a broadband wireless access (BWA) network, a WLAN, a WMAN, a wireless wide area network (WWAN), an Orthogonal Frequency Division Multiplexing (OFDM) network, an Orthogonal Frequency Division Multiple Access (OFDMA) network, a local area network (LAN), a wide area network (WAN), a metropolitan area network (MAN), the Internet, the World Wide Web, a cellular network, a radio network, a satellite network, and/or any other communications network configured to carry data. The embodiments are not limited in this context.

Communications system 100 may employ various modulation techniques including, for example: OFDM modulation, Quadrature Amplitude Modulation (QAM), N-state QAM (N-QAM) such as 16-QAM (four bits per symbol), 32-QAM (five bits per symbol), 64-QAM (six bits per symbol), 128-QAM (seven bits per symbol), and 256-QAM (eight bits per symbol), Differential QAM (DQAM), Binary Phase Shift Keying (BPSK) modulation, Quadrature Phase Shift Keying (QPSK) modulation, Offset QPSK (OQPSK) modulation, Differential QPSK (DQPSK), Frequency Shift Keying (FSK) modulation, Minimum Shift Keying (MSK) modulation, Gaussian MSK (GMSK) modulation, and so forth. The embodiments are not limited in this context.

Communications system 100 may form part of a multi-carrier system such as an OFDM system. Furthermore, communications system 100 may form part of a multi-channel system such as a MIMO system. The MIMO system may employ one or more multi-carrier communications channels for communicating multi-carrier communication signals. A multi-carrier channel may comprise, for example, a wideband channel comprising multiple sub-channels. The MIMO system may be arranged to communicate one or more spatial data streams using an antenna array having multiple antennas. Examples of an antenna include an internal antenna, an omni-directional antenna, a monopole antenna, a dipole antenna, an end fed antenna, a circularly polarized antenna, a micro-strip antenna, a diversity antenna, a dual antenna, a tri-band antenna, a quad-band antenna, and so forth.

In various embodiments, one or more nodes of communications system 100 may comprise a physical (PHY) layer component for WLAN devices either hardware or software based on IEEE standards 802.11n, 802.16-2004, and/or 802.16e, for example. In one embodiment, one or more nodes of communications system 100 may comprise a transceiver for a MIMO-OFDM system. The embodiments are not limited in this context.

As shown in FIG. 1, one or more nodes of communications system 100 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, DSPs, PLDs, ASICs, circuits, registers), software components (e.g., programs, subroutines, logic), and/or any combination thereof.

In various embodiments, communications system 100 may comprise a transmitter node 102 and a receiver node 120 communicating over wireless MIMO channel 118. In one embodiment, for example, the transmitter node 102 may comprise a MIMO transmitter to transmit one or more spatial data streams over a multi-carrier communication channel such as MIMO channel 118. In one embodiment, for example, the receiver node 120 may comprise a MIMO receiver to receive one or more spatial data streams over a multi-carrier communication channel such as MIMO channel 118. Although FIG. 1 illustrates transmitter node 102 and receiver node 120 as implemented in two separate devices by way of example in order to facilitate description, it may be appreciated that both transmitter node 102 and receiver node 120 may be implemented in a single device as desired for a given implementation. The embodiments are not limited in this context.

The transmitter node 102 may comprise an encoder block 104. In various embodiments, the encoder block 104 may be arranged to generate an encoded bit sequence from input data flow. The encoder block 104 may use various coding rates (e.g., ½, ⅔, ¾) depending on the puncturing pattern. In one embodiment, for example, the encoder block 104 may comprise an error-correcting encoder, such as one or more forward error correcting (FEC) encoders, and may generate a bit sequence encoded with an FEC code. In other embodiments, the encoder block 104 may comprise a convolutional encoder. The embodiments are not limited in this context.

The transmitter node 102 may comprise an interleaver block 106. In various embodiments, the interleaver block 106 may perform interleaving on the bits of the encoded bit sequence. In one embodiment, for example, the interleaver block 106 may comprise one or more frequency interleavers. The embodiments are not limited in this context.

The transmitter node 102 may comprise a mapper block 108. In various embodiments, the mapper block 108 may map the interleaved bit sequence into a sequence of transmit symbols. In one embodiment, for example, the mapper block 108 may map the interleaved bit sequence into a sequence of OFDM symbols. Each OFDM symbol may comprise N frequency symbols, with N representing a positive integer (e.g., 16, 64). In various implementations, the mapper block 108 may map the transmit symbols to subcarrier signals of a multi-carrier communication channel.

The transmitter node 102 may comprise a transmit (TX) MIMO signal processing block 110. TX MIMO signal processing block 10 may be implemented using any suitable type of processor and memory as desired for a given set of design or performance constraints. Examples of processors may include a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor may be implemented as a general purpose processor or dedicated processor. Examples of dedicated processors may include a controller, microcontroller, embedded processor, a digital signal processor (DSP), a network processor, a media processor, an input/output (I/O) processor, and so forth. The memory may include any machine-readable or computer-readable media capable of storing data, including both volatile and non-volatile memory. Examples for memory may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory may be included on the same integrated circuit as the processor, or alternatively some portion or all of the memory may be disposed on an integrated circuit or other medium, for example a hard disk drive, that is external to the integrated circuit of the processor. The embodiments are not limited in this context.

In various embodiments, the TX MIMO signal processing block 110 may be arranged to perform various multiple antenna signal processing techniques such as such as space-time coding (STC), TX beamforming, MIMO coding, and/or other MIMO processing techniques, for example. In various implementations, the TX MIMO signal processing block 110 may be arranged to apply beamformer and/or equalizer weights to transmit symbols (e.g., OFDM symbols). In various implementations, one or more of the MIMO signal processing techniques may involve the calculation of spatial expansion matrices or spatial spreading matrices for every subcarrier and/or group of adjacent subcarriers and the multiplication of OFDM subcarrier symbols in the frequency domain by a weighting matrix. The embodiments are not limited in this context.

The transmitter node 102 may comprise inverse fast Fourier transform (IFFT) blocks 112-1-$n$, where n represents a positive integer value. In various embodiments, the IFFT blocks 112-1-$n$ may be arranged to convert OFDM symbols to time-domain signals. In various implementations, the IFFT blocks 112-1-$n$ may perform guard interval (GI) insertion. In such implementations, GI insertion may comprise inserting a time-domain guard interval between OFDM symbols to reduce inter-symbol interference.

The transmitter node 102 may comprise digital-to-analog conversion (DAC) and radio-frequency (RF) processing blocks 114-1-$n$, where n represents a positive integer value. In various embodiments, the DAC and RF processing blocks 114-1-$n$ may be arranged to perform DAC processing and to generate RF signals for transmission on the spatial channels of a multi-carrier communication channel.

The transmitter node 102 may comprise transmit antennas 116-1-$n$, where n represents a positive integer value. In various embodiments, each of the transmit antennas 116-1-$n$ may correspond to one of the spatial channels of a multi-carrier communications channel.

The transmitter node 102 may transmit information over communication channel 118. In various embodiments, the communication channel 118 may comprise a multi-carrier communication channel (e.g., MIMO channel) for communicating multi-carrier communication signals (e.g., OFDM signals). The MIMO channel may comprise, for example, a wideband channel comprising multiple subchannels. Each subchannel may comprise closely spaced orthogonal data subcarriers allowing a single OFDM symbol to be transmitted together by the data subcarriers. The embodiments are not limited in this context.

Communications system 100 may also include a receiver node 120 for receiving information over MIMO channel 118. In various embodiments, the receiver node 120 may comprise receive antennas 122-1-$m$, where m represents a positive integer value. It may be appreciated that the number of antennas in the receiver may be the same or different from the number of antennas in the transmitters in certain implementations.

The receiver node 120 may comprise RF and analog-to-digital conversion (ADC) processing blocks 124-1-$m$, where m represents a positive integer value. In various embodiments, the RF and ADC processing blocks 124-1-$n$ may be arranged to perform RF and ADC processing on signals received on the spatial channels of a multi-carrier communication channel.

The receiver node 120 may comprise Fast Fourier Transform (FFT) blocks 126-1-$m$, where m represents a positive integer value. In various embodiments, the FFT blocks 126-1-$m$ may be arranged to convert time-domain signals to frequency-domain signals. In various implementations, the FFT blocks 126-1-$m$ may perform GI removal. In such implementations, GI removal may comprise removing a time-domain guard interval between OFDM symbols.

The receiver node 120 may comprise a receive (RX) MIMO signal processing block 128. RTX MIMO signal processing block 128 may be implemented using any suitable type of processor and memory, such as described with reference to TX MIMO signal processing block 110, for example. In various embodiments, the RX MIMO signal processing block 128 may be arranged to perform various multiple antenna signal processing techniques including, for example: channel estimation, frequency domain equalization, space-time decoding, RX beamforming, MIMO decoding, and/or other MIMO processing techniques such as MIMO detection schemes used in 802.11n and 802.16e transceivers. In various implementations, the RX MIMO signal processing block 128 may be arranged to calculate beamformer weights as applied in the transmitter node 102. Furthermore, the RX MIMO signal processing block 128 may also be arranged to calculate equalization weights and to apply the equalizer weights to receive symbols (e.g., OFDM symbols). In various implementations, one or more of the MIMO signal processing techniques may involve the calculation of weight matrices for every subcarrier and/or or group of adjacent subcarriers and the multiplication of OFDM subcarrier symbols in the frequency domain by a weighting matrix to produce linear estimates of the transmitted signal. The embodiments are not limited in this context.

The receiver node 120 may comprise a demapper block 130. In various embodiments, the demapper block 130 may be arranged to demap a sequence of symbols, such as a sequence of OFDM symbols. The embodiments are not limited in this context.

The receiver node 120 may comprise a deinterleaver block 132. In various embodiments, the deinterleaver block 132 may perform deinterleaving on the bits of the encoded bit sequence. In one embodiment, for example, the deinterleaver block 132 may comprise a frequency deinterleaver. The embodiments are not limited in this context.

The receiver node 120 may comprise a decoder block 134. In various embodiments, the decoder block 134 may be arranged to decode an encoded bit sequence into an output data flow. The decoder block 134 may use various coding rates (e.g., ½, ⅔, ¾) depending on the puncturing pattern. In one embodiment, for example, the decoder block 134 may comprise an error-correcting encoder, such as an FEC decoder, and may generate an output data flow from a bit sequence encoded with an FEC code. In other embodiments, the decoder 134 may comprise a convolutional decoder. The embodiments are not limited in this context.

In various embodiments, transmitter node 102 and receiver node 120 may be arranged to support multiple antenna techniques such as MIMO and/or SDMA modes of transmission, which allow spatial multiplexing of data streams from one or multiple users. To accomplish this, transmitter node 102 may need to generate an appropriate steering matrix for transmit spatial processing when transmitting over MIMO channel 118 to receiver node 120. In order to calculate an appropriate steering matrix, transmitter node 102 needs to have an accurate estimate of the transmit channel. Channel estimates may be obtained using an implicit feedback technique or an explicit feedback technique.

In order to better provide examples for implicit and explicit feedback techniques, assume a beamformer node and a beamformee node each has a transmitter node 120 and a receiver node 120. Further assume the beamformer node initiates a feedback technique to perform beamforming operations, while the beamformer node provides feedback information to the beamformer node in order to support the beamforming operations.

In one case, channel estimates may be obtained using an implicit feedback technique. With implicit feedback, the beamformer node receives training symbols (e.g., HT-LTFs) from the beamformee node. If the channel is reciprocal, then the beamformer node can use the training symbols that it receives from the beamformee node to make a channel estimate suitable for computing transmit steering matrix. Generally, reciprocity requires calibrated RF transceivers in MIMO systems.

In another case, channel estimates may be obtained using an explicit feedback technique. With explicit feedback, the beamformee node makes a direct estimate of the channel that the beamformer node is preparing to transmit over, from training symbols sent to the beamformee node from the beamformer node. The beamformee node may prepare Channel State Information (CSI) or one or more steering matrices, which is returned to the beamformer node by the beamformee node. When using explicit beamforming, the beamformer node is using explicit feedback information it receives from the beamformee node to calculate the steering matrices used for beamforming operations. The explicit feedback information may have one of the exemplary following formats:

1. Uncompressed Channel State Information—The responder sends to the initiator the MIMO channel coefficients;
2. Compressed Channel State Information—The responder sends to the initiator the compressed Channel State Information, the transmitter may use those for generating or modifying the steering matrices after the de-compression of the data.
3. Uncompressed steering matrices—the responder sends to the initiator the calculated steering matrices, the transmitter may use those for transmission as the steering matrices; and
4. Compressed steering matrices—the responder sends to the initiator the compressed steering matrices, the transmitter may use those for transmission as the steering matrices after the de-compression of the data.

The beamformee node quantizes the result and sends it back to the beamformer node, which then uses it as is or computes the steering matrix using the data returned by the beamformee node. The explicit feedback technique may be further described with reference to FIG. 2.

Figure 2:
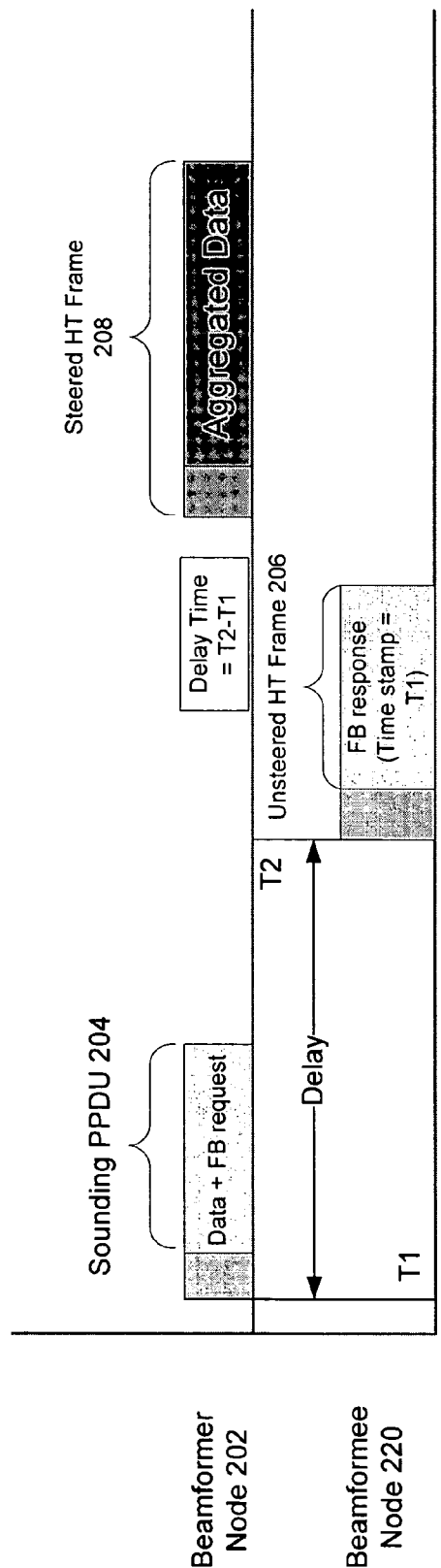
FIG. 2 illustrates one embodiment of an explicit feedback technique.

FIG. 2 illustrates one embodiment of an explicit feedback technique. FIG. 2 illustrates a beamformer node 202 communicating information to a beamformee node 220 over MIMO channel 118. The beamformer node 202 may be implemented using transmitter node 102 and receiver node 120. In one embodiment, for example, the beamformer node 202 may comprise an 802.11 WLAN access point (AP) connected to a wired network such as the Internet. The beamformee node 220 may also be implemented using transmitter node 102 and receiver node 120. In one embodiment, for example, the beamformee node 220 may comprise any 802.11 wireless node having an 802.11 transceiver capable of communicating with the 802.11 WLAN AP, such as a computer (e.g., handheld, laptop, desktop, etc.), a cellular telephone, a smart phone, and so forth. The information may be communicated using a series of discrete logical units having a format as defined by the 802.11 series of standards and draft standards. Examples of logical units may include packets, frames, cells, fragments, units, data units, packet data units, and so forth. Although FIG. 2 may be described in terms of the 802.11 series of standards and variants by way of example, it may be appreciated that the explicit feedback delay measurement techniques as described herein may be used with any multiple antenna system arranged to perform beamforming operations, such as a system arranged in accordance with the 802.16 series of standards and variants, as well as others.

The beamformer node 202 may use the explicit feedback information from the beamformee node 220 to perform beamforming operations to improve channel efficiency and utilization. For example, the beamformer node 202 may request and use the explicit feedback information in the form of CSI for computing the steering matrices to perform transmit beamforming operations. A similar frame exchange can also accommodate computation of the steering matrices at the beamformee node 220. In this case, instead of sending back explicit feedback information in the form of CSI, the beamformee node 220 will return explicit feedback information in the form of quantized steering matrices to the beamformer node 202, and the beamformer node 202 may use the quantized steering matrices for subsequent transmissions. The explicit feedback information in the form of steering matrices can be compressed or uncompressed. The type of explicit feedback information returned to the beamformer node 202 is subject to the advertised capabilities of the beamformee node 220.

In general operation, the beamformer node 202 initiates the explicit feedback sequence by sending a CSI feedback (CFB) request message. The CFB request message may comprise, for example, an un-steered sounding PPDU 204 containing the CFB Request. The beamformee node 220 may use sounding PPDU 204 or any other PPDU on its own decision to make a channel estimate, and collects the CSI of the channel. The beamformee node 220 may quantize the CSI and return the quantized CSI to beamformer node 202 using a CFB response message. The CFB response message may comprise, for example, an un-steered high-throughput (HT) frame 206 containing the CFB Response. The beamformer node 202 uses the result to transmit a steered HT frame 208 to the beamformee node 220. If the beamformer node 202 has a subsequent PPDU to send in steered mode, this PPDU may also be used as a sounding PPDU by the beamformee node 220. The explicit feedback operations may be continuously repeated for an ongoing beamforming exchange.

If latencies cause the CSI or steering matrices to get stale, then the explicit feedback sequence may be restarted using sounding PPDU 204. In some cases, however, the beamformer node 202 may be unable to determine whether the CSI or steering matrices are stale, or which steering matrix was used when the sounding was transmitted. For example, MIMO channel 118 can be altered for a number of reasons, such as if the position of the beamformee node 220 changes, objects in the communication area changes, load on the channel changes, and so forth. In this case the steering matrix should be changed using the explicit feedback information submitted by the beamformee node 220. If MIMO channel 118 fluctuates faster than the explicit feedback information arrives, however, the explicit feedback information may become unreliable or irrelevant to the beamformer node 202.

Various explicit feedback delay measurement techniques may be used to assist the beamformer node 202 in determining whether the explicit feedback information received from the beamformee node 220 arrives too late to be useful for calculating or modifying the steering matrix. In accordance with a first explicit feedback delay measurement technique, for example, a time constant of channel fluctuation may be estimated analytically or by simulation. The beamformee node 220 may generate and send a CFB response that contains a time stamp for when the beamformee node 220 receives the CFB request. The beamformer node 202 may calculate the delay time by subtracting the time stamp from the CFB response arrival time. The beamformer node 202 may decide whether to use the explicit feedback information sent with the CFB response to modify or change the steering matrix by comparing the delay time with the estimated channel time constant.

In further detail, the TX MIMO signal processing block 110 of the transmitter node 102 of the beamformer node 202 may generate a steering matrix for transmit spatial processing over MIMO channel 118. The TX MIMO signal processing block 110 may determine a delay time associated with explicit feedback information for MIMO channel 118. The TX MIMO signal processing block 110 may determine whether to modify the steering matrix with the explicit feedback information based on the delay time.

In one embodiment, for example, the TX MIMO signal processing block 110 may determine whether to modify the steering matrix by estimating a time constant for channel variations of MIMO channel 118. The TX MIMO signal processing block 110 may compare the time constant with the delay time, and modify the steering matrix based on said comparison. For example, the TX MIMO signal processing block 110 may modify the steering matrix if the delay time is less than the time constant, and in some cases, equal to the time constant.

In one embodiment, for example, the TX MIMO signal processing block 110 may determine a delay time using the first explicit feedback delay measurement technique. The transmitter node 102 of the beamformer node 202 may send a CFB request message to the beamformee node 220. The receiver node 120 of the beamformee node 220 may receive the CFB request message, gather CSI for MIMO channel 118, and generate a CFB response message. The beamformee node 220 may send the CFB response message with the CSI. Alternatively, the beamformee node 220 may generate a steering matrix with the CSI, and send the CFB response message with the steering matrix in a compressed or uncompressed format.

In addition the CSI and/or steering matrix, the beamformee node 220 may include a time stamp in the CFB response message indicating when the corresponding CFB request message was received by the beamformee node 220 (e.g., T1). The CFB response message may comprise a format modified to include a new field to accommodate the time stamp value, or an existing field may be used to communicate the time stamp value. The beamformer node 202 may receive the CFB response message with the time stamp T1. The TX MIMO signal processing block 110 may retrieve a time stamp indicating when the CFB response message was received by the beamformer node 202 (e.g., T2). The TX MIMO signal processing block 110 may then determine or calculate a delay time using time stamps T1, T2 (e.g., Delay Time=T2−T1).

In one embodiment, for example, the TX MIMO signal processing block 110 may also determine a delay time using a second explicit feedback delay measurement technique. For the second explicit feedback delay measurement technique, the transmitter node 102 of the beamformer node 202 may send a CFB request message to the beamformee node 220. The beamformer node 202 may store a time stamp for the CFB request message, with the time stamp indicating when the beamformer node 202 sent the CFB request message. The receiver node 120 of the beamformee node 220 may receive the CFB request message, gather CSI for MIMO channel 118, and generate a CFB response message with the CSI and/or new steering matrix. The beamformee node 220 may send the CFB response message to the beamformer node 202. The beamformer node 202 may receive the CFB response message, and store a time stamp of when the CFB response message was received by the beamformer node 202. The TX MIMO signal processing block 110 may then determine or calculate a delay time using the time stamps. For example, the TX MIMO signal processing block 110 may calculate a round trip delay between sending the CFB request message and receiving the CFB response message, and dividing by 2. It is worthy to note that TX MIMO signal processing block 110 may need to maintain a table of time stamps with corresponding CFB request messages, and employ techniques to determine whether a given CFB request message corresponds to a given CFB response message. This may be accomplished by explicitly marking each CFB request-response pair with unique identifiers, or implicitly by employing some heuristics (e.g., time based) to determine a given CFB request-response pair. The embodiments are not limited in this context.

In various embodiments, the TX MIMO signal processing block 110 may modify the steering matrix with the explicit feedback information in a number of different ways. For example, the TX MIMO signal processing block 110 may modify the steering matrix with CSI from the explicit feedback information. In another example, the TX MIMO signal processing block 110 may modify the steering matrix by replacing the steering matrix with a different steering matrix from the explicit feedback information, such as a steering matrix generated by the beamformee node 220, for example.

Operations for various embodiments may be further described with reference to the following figures and accompanying examples. Some of the figures may include a logic flow. It can be appreciated that an illustrated logic flow merely provides one example of how the described functionality may be implemented. Further, a given logic flow does not necessarily have to be executed in the order presented unless otherwise indicated. In addition, a logic flow may be implemented by a hardware element, a software element executed by a processor, or any combination thereof. The embodiments are not limited in this context.

Figure 3:
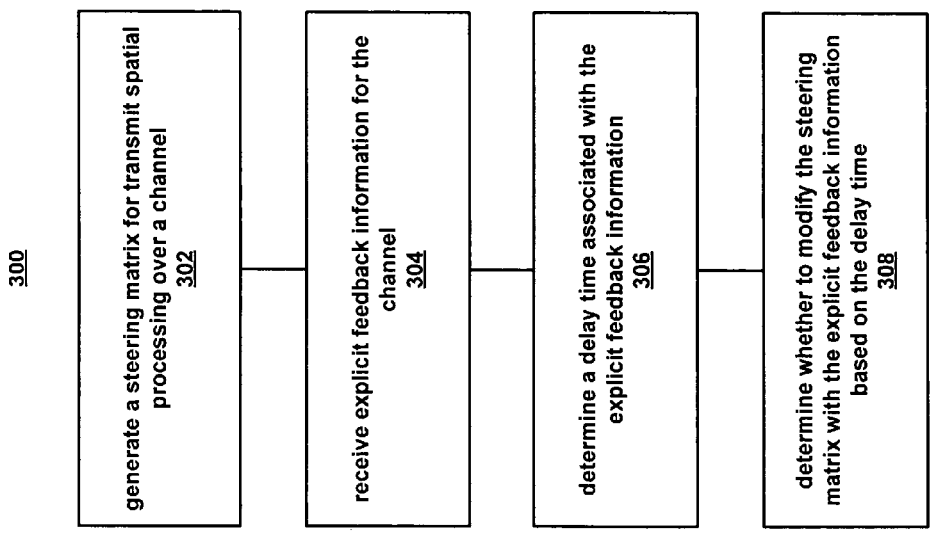
FIG. 3 illustrates one embodiment of a logic flow.

FIG. 3 illustrates one embodiment of a logic flow. FIG. 3 illustrates a logic flow 300 for an explicit feedback delay measurement technique for transmit spatial processing. In various embodiments, the logic flow 300 may be performed by various systems, nodes, and/or modules. It is to be understood that the logic flow 300 may be implemented by various other types of hardware, software, and/or combination thereof. The embodiments are not limited in this context.

As shown in FIG. 3, the logic flow 300 may generate a steering matrix for transmit spatial processing over a channel at block 302. Explicit feedback information for the channel may be received at block 304. A delay time associated with the explicit feedback information may be determined at block 306. A determination as to whether to modify the steering matrix with the explicit feedback information based on the delay time may be made at block 308. The embodiments are not limited in this context.

In one embodiment, for example, determination operations at block 308 may be performed by estimating a time constant for channel variations of the channel. The time constant may be compared with the delay time. The steering matrix may be modified based on the comparison. The embodiments are not limited in this context.

In one embodiment, for example, determination operations at block 306 may be performed by sending a CFB request message. A CFB response message may be received. A time stamp may be retrieved from the CFB response message, the time stamp to indicate when the CFB request message was received. A time stamp may be retrieved to indicate when the CFB response message was received. The delay time may be determined using the time stamps. The embodiments are not limited in this context.

In one embodiment, for example, determination operations at block 306 may also be performed by sending a CFB request message. A time stamp for when the CFB request message was sent may be stored. A CFB response message corresponding to the CFB request message may be received. A time stamp for when the CFB response message was received may be retrieved. The delay time may be determined using the time stamps. The embodiments are not limited in this context.

The steering matrix may be modified in a number of different ways. In one embodiment, for example, the steering matrix may be modified with the CSI from the explicit feedback information. In one embodiment, for example, a different steering matrix may be retrieved from the explicit feedback information. The existing steering matrix may be replaced with the new steering matrix. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising a processor to generate a steering matrix for transmit spatial processing over a channel, determine a delay time associated with explicit feedback information for said channel, estimate a time constant for channel variations of said channel, compare said time constant with said delay time, and modify said steering matrix with said explicit feedback information based on said comparison.

2. The apparatus of claim 1, comprising a transceiver coupled to said processor, said transceiver to send a channel state information feedback request message, and receive a channel state information feedback response message with said explicit feedback information.

3. The apparatus of claim 1, comprising a transceiver coupled to said processor, said transceiver to receive a channel state information feedback response message with said explicit feedback information and a time stamp for when a corresponding channel state information feedback request message was received, said processor to determine said delay time using said time stamp.

4. The apparatus of claim 1, said processor to modify said steering matrix with channel state information from said explicit feedback information.

5. The apparatus of claim 1, said processor to modify said steering matrix by replacing said steering matrix with a different steering matrix from said explicit feedback information.

6. A system, comprising:
an antenna array;
a transceiver coupled to said antenna array, said transceiver to receive explicit feedback information for a channel; and
a processor coupled to said transceiver, said processor to generate a steering matrix for transmit spatial processing over a channel using said antenna array, determine a delay time associated with said explicit feedback information, estimate a time constant for channel variations of said channel, compare said time constant with said delay time, and modify said steering matrix with said explicit feedback information based on said comparison.

7. The system of claim 6, said transceiver to send a channel state information feedback request message, and receive a channel state information feedback response message with said explicit feedback information and a time stamp for when said channel state information feedback request message was received, said processor to determine said delay time using said time stamp.

8. The system of claim 6, said transceiver comprising a multiple-input-multiple-output transceiver.

9. A computer-implemented method, comprising:
  generating a steering matrix for transmit spatial processing over a channel;
  receiving explicit feedback information for said channel;
  determining a delay time associated with said explicit feedback information
  estimating a time constant for channel variations of said channel;
  comparing said time constant with said delay time;
  modifying said steering matrix with said based on said comparison.

10. The computer-implemented method of claim 9, comprising:
  sending a channel state information feedback request message;
  receiving a channel state information feedback response message;
  retrieving from said channel state information feedback response message a time stamp for when said channel state information feedback request message was received;
  retrieving a time stamp for when said channel state information feedback response message was received; and
  determining said delay time using said time stamps.

11. The computer-implemented method of claim 9, comprising:
  sending a channel state information feedback request message;
  storing a time stamp for when said channel state information feedback request message was sent;
  receiving a channel state information feedback response message corresponding to said channel state information feedback request message;
  retrieving a time stamp for when said channel state information feedback response message is received; and
  determining said delay time using said time stamps.

12. The computer-implemented method of claim 9, comprising modifying said steering matrix with channel state information from said explicit feedback information.

13. The computer-implemented method of claim 9, comprising:
  retrieving a different steering matrix from said explicit feedback information; and
  replacing said steering matrix with said different steering matrix.

14. An article comprising a machine-readable storage medium containing instructions that when executed enable a system to generate a steering matrix for transmit spatial processing over a channel, receive explicit feedback information for said channel, determine a delay time associated with said explicit feedback information, estimate a time constant for channel variations of said channel, compare said time constant with said delay time, and modify said steering matrix with said explicit feedback information based on said comparison.

15. The article of claim 14, further comprising instructions that when executed enable the system to send a channel state information feedback request message, receive a channel state information feedback response message, retrieve from said channel state information feedback response message a time stamp for when said channel state information feedback request message was received, retrieve a time stamp for when said channel state information feedback response message was received, and determine said delay time using said time stamps.

16. The article of claim 14, further comprising instructions that when executed enable the system to send a channel state information feedback request message, store a time stamp for when said channel state information feedback request message was sent, receive a channel state information feedback response message corresponding to said channel state information feedback request message, retrieve a time stamp for when said channel state information feedback response message is received, and determine said delay time using said time stamps.

* * * * *